(12) United States Patent
Rodriguez et al.

(10) Patent No.: US 11,295,167 B2
(45) Date of Patent: Apr. 5, 2022

(54) AUTOMATED IMAGE CURATION FOR MACHINE LEARNING DEPLOYMENTS

(71) Applicant: Toshiba Global Commerce Solutions Holdings Corporation, Tokyo (JP)

(72) Inventors: Adrian Rodriguez, Durham, NC (US); Brian C. Young, Durham, NC (US); Bruno Roy, Durham, NC (US); Jonathan Waite, Cary, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 10 days.

(21) Appl. No.: 16/859,244

(22) Filed: Apr. 27, 2020

(65) Prior Publication Data

US 2021/0334590 A1 Oct. 28, 2021

(51) Int. Cl.
*G06K 9/62* (2006.01)
*G06K 9/00* (2006.01)

(52) U.S. Cl.
CPC ....... *G06K 9/6256* (2013.01); *G06K 9/00624* (2013.01)

(58) Field of Classification Search
CPC .................. G06K 9/6256; G06K 9/00624
See application file for complete search history.

(56) References Cited

U.S. PATENT DOCUMENTS

| 6,507,279 | B2 | 1/2003 | Loof | |
| 8,145,531 | B1 | 3/2012 | Ptak et al. | |
| 8,934,709 | B2 | 1/2015 | Saptharishi et al. | |
| 9,886,827 | B2 | 2/2018 | Schoner | |
| 9,978,086 | B1 | 5/2018 | Madden | |
| 10,062,039 | B1 | 8/2018 | Lockett | |
| 10,229,347 | B2 * | 3/2019 | Harary | G06K 9/6296 |
| 2003/0083936 | A1 | 5/2003 | Mueller et al. | |
| 2003/0101161 | A1 * | 5/2003 | Ferguson | G06K 9/6256 |
| 2013/0279570 | A1 | 10/2013 | Li et al. | |
| 2014/0267219 | A1 * | 9/2014 | Jain | G06N 7/005 345/418 |
| 2015/0055855 | A1 * | 2/2015 | Rodriguez | G06K 9/6259 382/159 |
| 2016/0140490 | A1 | 5/2016 | Kliper | |
| 2016/0328660 | A1 | 11/2016 | Huang | |
| 2017/0323376 | A1 | 11/2017 | Glaser et al. | |
| 2018/0189760 | A1 | 7/2018 | Brooks et al. | |
| 2018/0204562 | A1 * | 7/2018 | Gong | G10L 13/00 |
| 2018/0218351 | A1 | 8/2018 | Chaubard et al. | |

(Continued)

FOREIGN PATENT DOCUMENTS

WO 2017146595 A1 8/2017

OTHER PUBLICATIONS

Pankanti et al., "Practical Computer Vision: Example Technique and Challanges," Digital Object Identifier, 2011, 12 pages.

*Primary Examiner* — Pinalben Patel
(74) *Attorney, Agent, or Firm* — Patterson + Sheridan, LLP

(57) ABSTRACT

The present disclosure provides techniques for data curation and image evaluation. A first image is captured, and a first indication of a first item is received. A first identifier of the first item is then identified based on the first indication. Further, based on the first indication, it is determined that the first image depicts the first item. The first image is labeled with the first identifier, and a machine learning (ML) model of an ML system is trained based on the labeled first image.

14 Claims, 6 Drawing Sheets

(56) References Cited

U.S. PATENT DOCUMENTS

| | | |
|---|---|---|
| 2018/0240180 A1 | 8/2018 | Glaser et al. |
| 2018/0330196 A1 | 11/2018 | Chaubard et al. |
| 2020/0019754 A1* | 1/2020 | Adato ................ H04N 5/23219 |
| 2020/0242400 A1* | 7/2020 | Perkins ................ G06K 9/6256 |

* cited by examiner

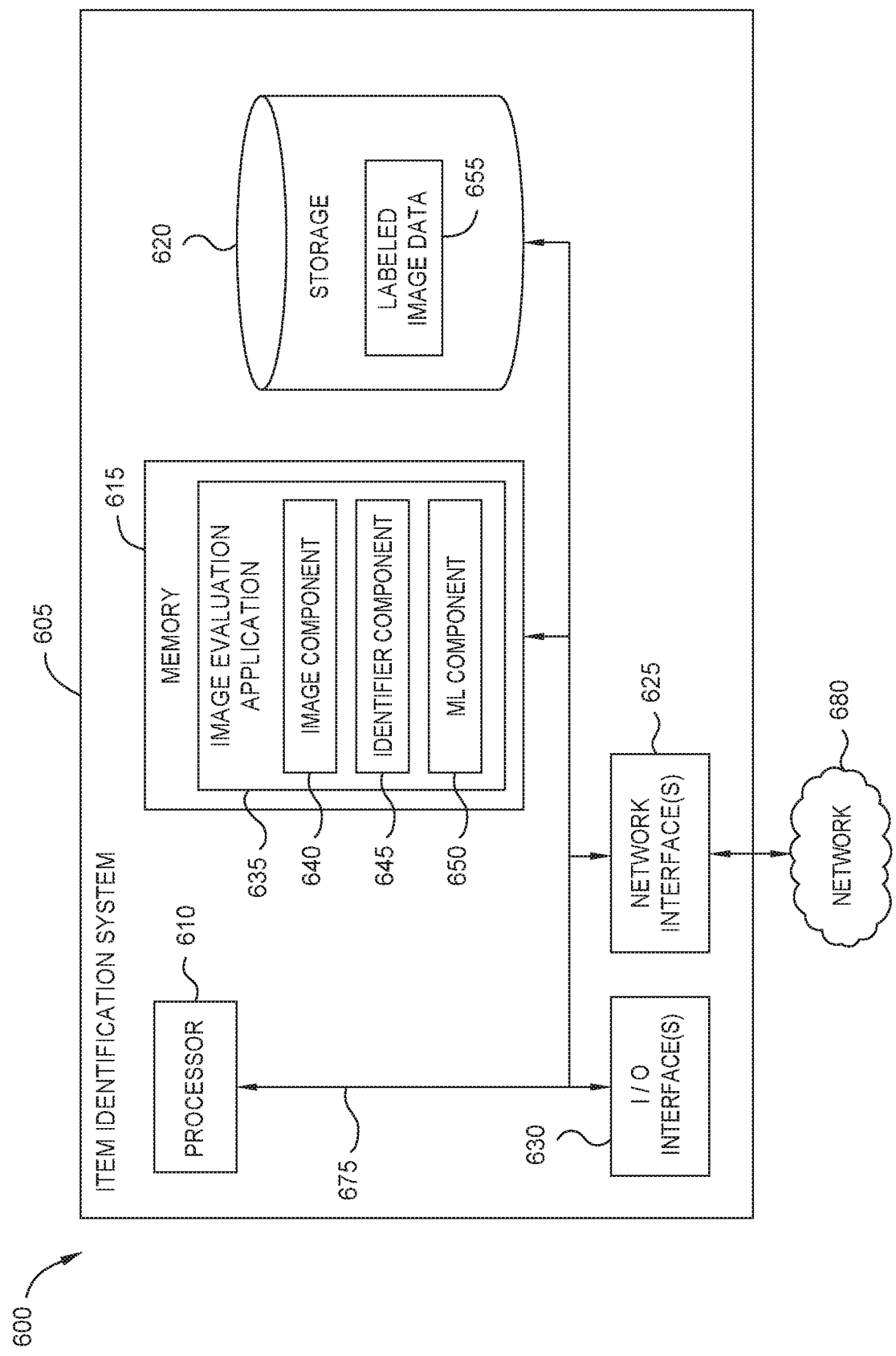

AUTOMATED IMAGE CURATION FOR MACHINE LEARNING DEPLOYMENTS

BACKGROUND

The present disclosure relates to machine learning, and more specifically, to automated data curation and machine learning deployment.

Machine learning models can be used for a wide variety of complex tasks. Typically, training such models requires a significant time and resource investment. For example, a large amount of labeled training data is often required in order to achieve high accuracy. If the training data is insufficient, the resulting models are less accurate and reliable. Collecting and curating this training data is an intensive and expensive process. Additionally, it is difficult or impossible to monitor whether the model performance is acceptable once it has been deployed. Where possible, doing so requires manual intervention.

SUMMARY

According to one embodiment of the present disclosure, a method is provided. The method includes capturing a first image, and receiving a first indication of a first item. The method further includes identifying, based on the first indication, a first identifier of the first item, and determining, based on the first indication, that the first image depicts the first item. Additionally, the method includes labeling the first image with the first identifier. The method then includes training a machine learning (ML) model of an ML system based on the labeled first image.

According to a second embodiment of the present disclosure, a computer-readable storage medium is provided. The computer-readable storage medium contains computer program code that, when executed by operation of one or more computer processors, performs an operation. The operation includes capturing a first image, and receiving a first indication of a first item. The operation further includes identifying, based on the first indication, a first identifier of the first item, and determining, based on the first indication, that the first image depicts the first item. Additionally, the operation includes labeling the first image with the first identifier. The operation then includes training a machine learning (ML) model of an ML system based on the labeled first image.

According to a third embodiment of the present disclosure, a system is provided. The system includes one or more computer processors, and a memory containing a program which, when executed by the one or more computer processors, performs an operation. The operation includes capturing a first image, and receiving a first indication of a first item. The operation further includes identifying, based on the first indication, a first identifier of the first item, and determining, based on the first indication, that the first image depicts the first item. Additionally, the operation includes labeling the first image with the first identifier. The operation then includes training a machine learning (ML) model of an ML system based on the labeled first image.

BRIEF DESCRIPTION OF THE DRAWINGS

FIG. 6 is a block diagram depicting an image identification system configured to automatically curate training data and deploy trained models, according to one embodiment disclosed herein.

DETAILED DESCRIPTION

Figure 1:
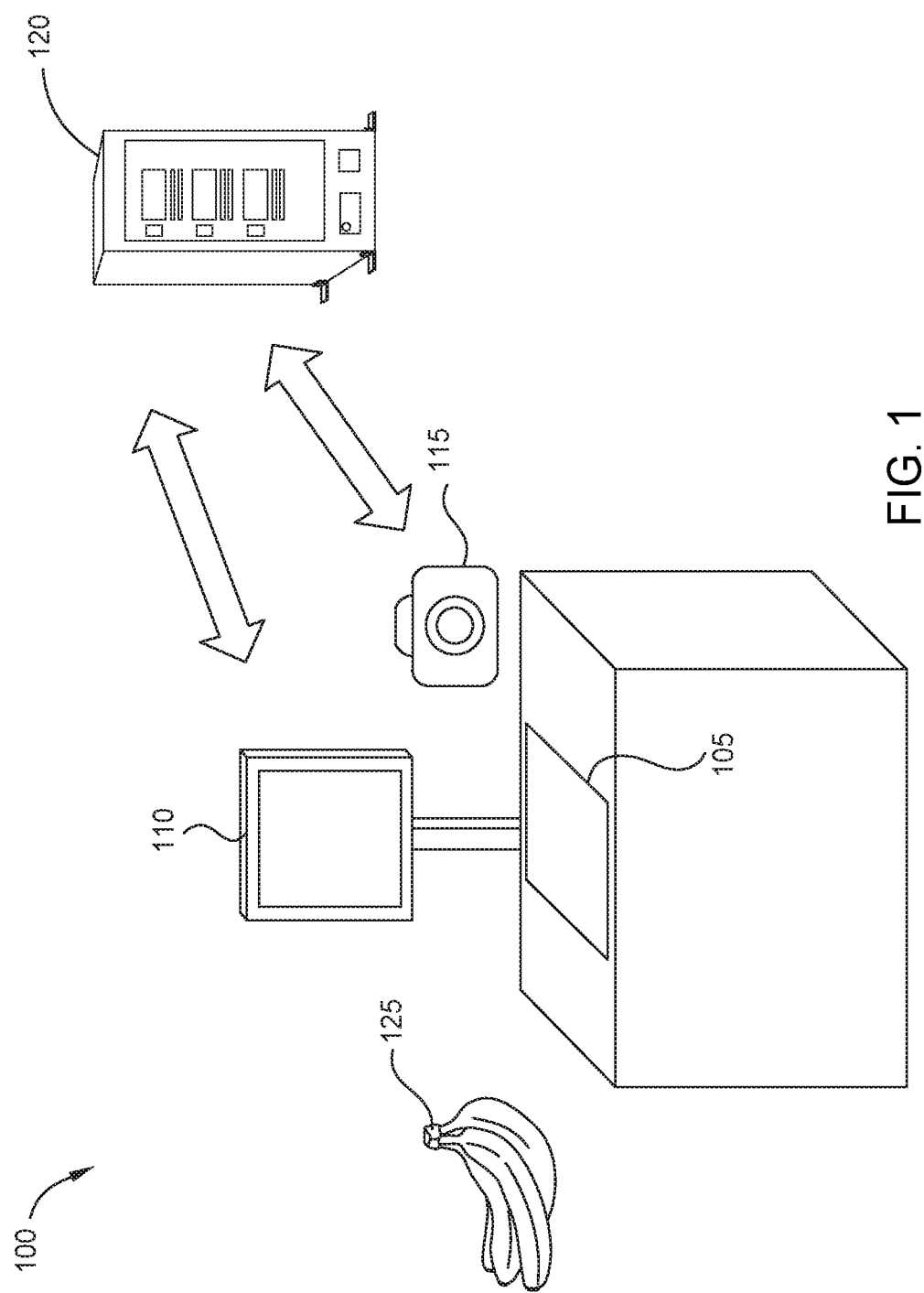
FIG. 1 illustrates an environment configured to automatically collect and curate training data and deploy machine learning models, according to one embodiment disclosed herein.

Embodiments of the present disclosure provide techniques to automatically collect and curate training data in a way that reduces or eliminates manual intervention and improves accuracy of the data. In some embodiments, this data can then be utilized to train high-fidelity models. Further, in some embodiments, the system is automatically monitored to dynamically and intelligently switch between operating modes during deployment, in order to better respond to changing conditions.

In embodiments of the present disclosure, data is automatically labeled and stored for use in training machine learning (ML) models. In one embodiment, the data includes image data of items, and the automatic labels include identifiers of the items pictured. For example, suppose the items include objects being purchased. In one embodiment, the system can capture one or more images of the objects. As part of the transaction, an identifier of the item (e.g., a price look-up code (PLU) or other scan of the item) is determined (e.g., by a cashier or the customer scanning a bar code, and/or manually entering the identifier). In one embodiment, the system automatically labels the captured images with the corresponding identifier(s) during use.

For example, in one such embodiment, the system captures an image of a designated area (e.g., a scale and/or scanner at a checkout area) upon receiving a scan event identifying the item. The system can then tag the captured image using the identifier. In another embodiment, the system can continuously capture images or video the area. Upon receiving a scan event, the system can identify and label the appropriate image(s) based on the scan. For example, the system may determine a timestamp and/or location associated with the scan, and identify image(s) that match the indicated time and/or location. Although items in a retail environment are described as examples, embodiments of the present disclosure can be deployed in any number of environments to collect and curate data.

Through normal use, the system can thereby automatically collect a large number of training exemplars that reflect any number of items. Further, the data represents actual real-world uses, which improves the accuracy of the models. Additionally, because the data is collected during ordinary use, the training exemplars reflect a wide variety of angles, lighting conditions, and distances for any given item. This similarly improves the performance and accuracy of the trained model(s).

In some embodiments, during use, the system can proceed based in part on the current deployment status of the system, and/or the model maturity. For example, in an "inactive" mode, the system may simply prompt users to manually input the identifier. In a "training" mode, the system can capture image(s) as users input the identifier, and tag these images accordingly. In one embodiment, during a "validation" mode, the system may capture images and evaluate them using the trained model(s), and verify these results against user-provided identifiers. Further, in a "deployed" state, the system can capture and evaluate images and identify the item(s), without requiring or requesting user input.

In at least one embodiment, the system can automatically shift between deployment states. For example, in one such embodiment, the system remains in a "training" state until predefined criteria are satisfied. This criteria can include a minimum percentage of items available at the location that have been imaged at least once (e.g., the system remains in training mode until at least 95% of the items have been imaged and logged at least once). Similarly, the criteria may include a minimum number of exemplars for each such item (e.g., at least one hundred images). Once the criteria are satisfied, the system can train and/or refine the model(s). Similarly, the system may then validate the models until criteria are satisfied (e.g., for a minimum length of time, until a minimum accuracy is achieved, and the like).

In some embodiments, the system can enter various stages of deployment at different times, depending on the particular item. That is, the system may be in an operational and deployed mode for one item (e.g., bananas) while remaining in a training or validation mode for others (e.g., apples). For example, the system may capture an image and evaluate it using the model(s) to classify the item. If the system determines that the item belongs to a category that is still in validation or training, the system may request that the user input an identifier. In contrast, if the item is classified as a mature item, the system can proceed without user input. In one embodiment, if the resulting classification confidence is below a defined threshold, the system requests user input. This low confidence may indicate, for example, that the item has not been imaged before (or has not been imaged sufficiently). Thus, the system can request user input to further refine the model(s). In at least one embodiment, the user can correct or override the model classification. If the system determines that its classifications are inaccurate, it can reenter training and/or validation mode for the relevant items.

In some embodiments, the deployment state can vary based on any number of factors extending beyond the item itself. In one embodiment, the system can further consider variables such as the time of day, the time of year, and the like. For example, the system may perform well during some hours (e.g., when the items are lit by overhead lighting), but poorly when the sun shines through a window and lights the items unevenly. In one such embodiment, therefore, the system can dynamically determine whether to request user input based on factors including the determined classification, the classification confidence, the time of day, the time of year, and the like.

Advantageously, the system can utilize the image repository across any number of locations. For example, a model may be trained at a first location, and deployed at a second. In one embodiment, the system can then refine each model as needed in order to better-fit the actual deployment location. This allows the system to provide trained models that share significant overlap and training data, while maintaining flexibility to allow each model to be refined and/or utilized as needed for the given deployment.

FIG. 1 illustrates an environment 100 configured to automatically collect and curate training data and deploy machine learning models, according to one embodiment disclosed herein. In the illustrated embodiment, a Camera 115 or other imaging device captures images and/or video of Items 125 in a Sensing Zone 105, and relays the data to a Computer 120. The Sensing Zone 105 generally includes any area or location where data about one or more Items 125 is collected. For example, the Sensing Zone 105 may include an optical scanner (e.g., to identify bar codes), one or more load cells to determine the weight of the Item 125, and the like. Although depicted as a discrete component for conceptual clarity, in some embodiments, the Camera 115 may be integrated into the Sensing Zone 105 (e.g., above or below the scanner/zone). Further, although depicted as residing adjacent to the Sensing Zone 105, in embodiments, the Camera 115 may be located in any suitable location, including above the area (e.g., mounted to the ceiling). Additionally, in some embodiments, multiple Cameras 115 can be arranged surrounding the Sensing Zone 105.

In the illustrated embodiment, the Camera 115 is communicatively linked to a Computer 120 via one or more wired and/or wireless connections. Further, the Computer 120 is communicatively linked to a Terminal 110. The Terminal 110 may include one or more outputs (e.g., video and/or audio), as well as inputs (e.g., via a touch screen). In one embodiment, when an Item 125 enters the Sensing Zone 105, the system captures various information relating to the Item 125. For example, in a training state, the system may use the Camera 115 to capture an image of the Item 125, while the user enters an identifier (e.g., via the Terminal 110). Additionally or alternatively, a scanner or other device can be used to capture an identifier of the item. Further, the Sensing Zone 105 may determine a weight of the Item 125.

In various embodiments, Items 125 may be placed in the Sensing Zone 105, and/or passed through the Sensing Zone 105 (e.g., by a user passing the item through the zone, or by a belt carrying items through the zone). In some embodiments, the Camera 115 is continuously capturing images and/or video and transmitting them to the Computer 120. In some embodiments, the Camera 115 captures images upon instruction. For example, when an Item 125 is detected in the Sensing Zone 105 (e.g., by a scale), and/or when a user enters an identifier for an Item 125, the Camera 115 can capture one or more images of the item in the zone.

In a training phase, when the Computer 120 receives an identifier (e.g., via the Terminal 110 and/or a scanner in the Sensing Zone 105), it identifies the corresponding image(s) captured by the Camera 115 (e.g., based on the timestamp of the identifier input, the location of the input, and the like). The relevant images can then be tagged or labeled with the appropriate identifier. For example, if the system continuously captures images, the Computer 120 can extract a timestamp and/or location from the received item indication. This can include a time and/or location (e.g., identification of the Terminal 110) where the identifier was manually provided, and/or a time and location (e.g., identification of the Sensing Zone 105) where a scan was captured. The Computer 120 can then use this information to identify images that were captured at the same or a similar time and/or location.

In some embodiments, the Computer 120 triggers the Camera 115 to capture one or more images in response to the item input. For example, the Computer 120 can determine the location of the Item 125 based on the input indication (e.g., based on the Terminal 110 that provided the input), and identify the Camera(s) 115 positioned to capture images of the corresponding area. These Cameras 115 can then capture the images and return them to the Computer 120 for processing.

In an embodiment, during this training phase, the Computer 120 thus continues to capture and label images of Items 125, and storing them in a repository. ML model(s) can then be trained using these labeled exemplars. In a validation mode, the Computer 120 can continue to receive indications of Items 125, as well as images of the Items 125. The Computer 120 can then evaluate the image using the trained model(s), and compare the resulting prediction to the actual identifier included in the indication. This allows the system to determine the accuracy and reliability of the model (which, in some embodiments, includes determining model accuracy at various times of the day and/or year, or at various deployment locations), as well as to continue to refine/train the model(s) if needed.

Once the models are sufficiently accurate, the system can enter active deployment. In this state, when an Item 125 enters the Sensing Zone 105, the Camera 115 captures one or more images (e.g., based on detecting the weight of the item, or using other sensing devices to determine the presence of an object). These images are then evaluated using the trained ML model(s). The resulting classification can then be used to identify the Item 125, and the system refrains from requesting or receiving the item identifier. For example, the system may instruct the user to continue to the next Item 125, and/or refrain from presenting an input interface on the Terminal 110. If the user indicates that the classification was incorrect, in some embodiments, the system allows the user to correct the label. This information can be used to continuously monitor model performance, as well as to refine the model(s) as needed.

In some embodiments of the present disclosure, the system can dynamically learn new Items 125 without intervention. For example, if a new Item 125 is added to inventory, the system will initially misclassify it regularly (or will generate classifications with low confidence). Based on this, the Computer 120 can determine that the model should re-enter a training phase, at least for this new Item 125. This allows the system to automatically shift between deployment modes and continuously learn and improve.

Figure 2:
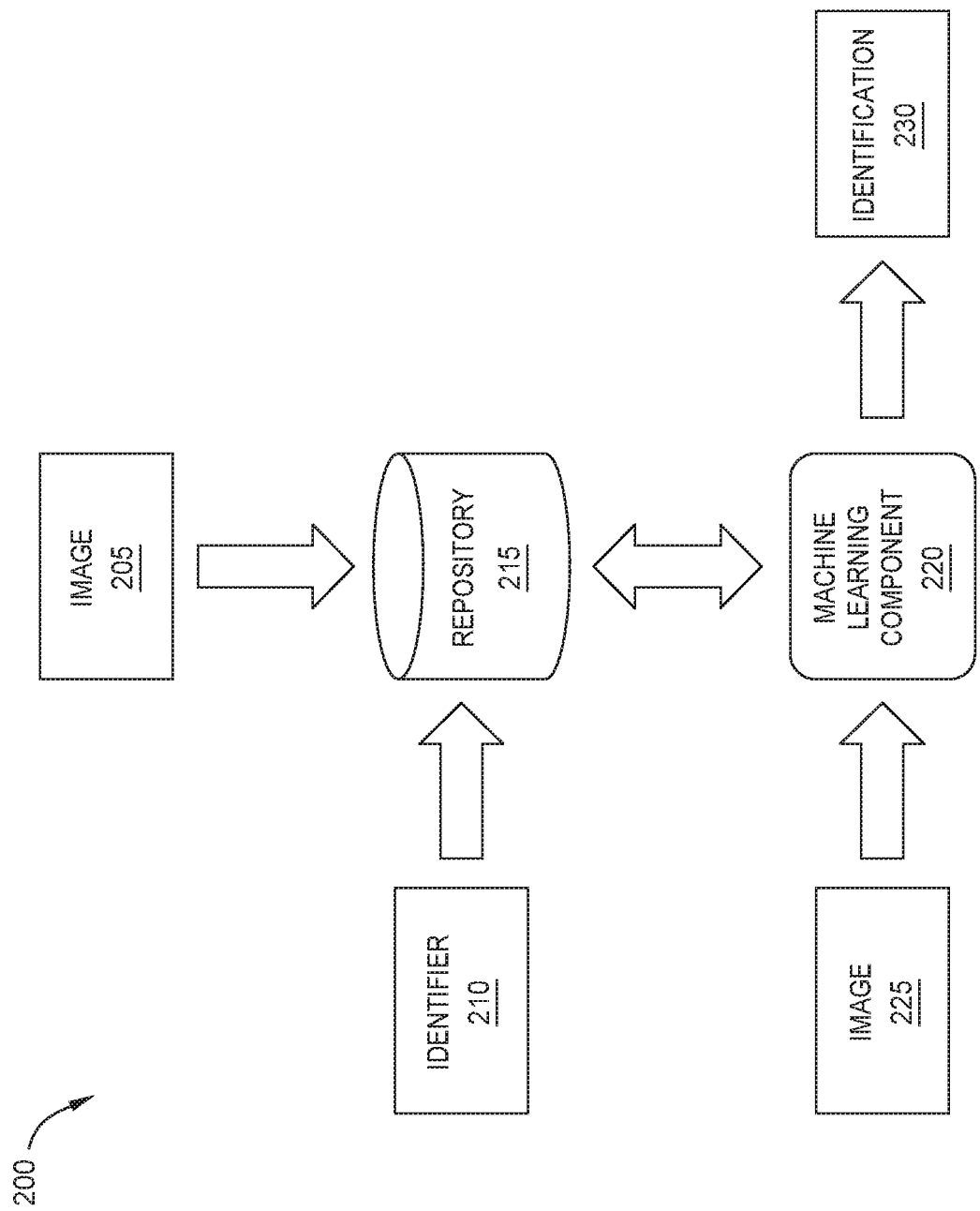
FIG. 2 depicts a workflow for collecting and curating training data, training machine learning models, and deploying them for image recognition, according to one embodiment disclosed herein.

FIG. 2 depicts a workflow 200 for collecting and curating training data, training machine learning models, and deploying them for image recognition, according to one embodiment disclosed herein. In the illustrated embodiment, Images 205 and Identifiers 210 are collected and stored in a Repository 215. In an embodiment, the Images 205 are captured by one or more cameras in a physical space. For example, in one embodiment, the Images 205 are captured at or near a checkout area of the store by one or more cameras arranged to capture images of the counter, belt, scanner, scale, or other area where items are placed during checkout.

In various embodiments, the Images 205 may be captured in any suitable area, including in an exit area (e.g., by one or more cameras configured to capture images as customers push carts out of the store), on or near shelves in the store, and the like. In embodiments, the Identifiers 210 are generally used to identify/label the items. For example, the Identifiers 210 can include serial numbers, PLUs, and the like. In one embodiment, the Identifiers 210 are provided by a user, such as a cashier or customer. For example, in one such embodiment, the user enters the Identifier 210 while checking out. In some embodiments, the Identifier 210 may be automatically determined (e.g., by an optical scanner).

In some embodiments, indications of each item stored in the Repository 215 also include additional information, such as the weight or count of the item. For example, for items that are sold/classified by weight, a scale can be used to weigh the items. In one embodiment, along with the Identifier 210, this weight is provided and stored in the Repository 215. Similarly, for items classified/sold by number/count, the user can enter the count as well as the Identifier 210, and both can be stored in the Repository 215. In some embodiments, the model(s) can be thus trained to not only classify the items, but also predict the count and/or weight.

The Identifiers 210 are used to label the Images 205. In one embodiment, upon receiving an Identifier 210, the system captures one or more corresponding Images 205. For example, the system may determine the location where the identifier was entered (e.g., the terminal or register used by the user to enter the Identifier 210), and identify one or more cameras that correspond to that location. The system can then trigger one or more Images 205 to be captured by those cameras, and label the resulting Images 205 with the Identifier 210. In another embodiment, the system can further determine the time that the Identifier 210 was received, and retrieve one or more Images 205 that were captured at or within a predefined window around that time, at the relevant location.

In this way, the system can use the labeled images as training exemplars. In the illustrated embodiment, a Machine Learning Component 220 utilizes the Repository to train one or more ML models. For example, the Machine Learning Component 220 can provide each Image 205 (or a vector equivalent) as input to one or more ML models, and utilize the corresponding label (Identifier 210) as target output. The Machine Learning Component 220 can then propagate the loss back through the model(s). In this way, models are iteratively trained to classify input Images 205 and output corresponding Identifiers 210 of the item(s) contained in the image.

As illustrated, these labeled exemplars are stored in one or more Repositories 215. The Repository 215 may be maintained locally, in a remote environment (e.g., in the cloud), and/or distributed across a number of storage locations. In some embodiments, each labeled Image 205 further indicates other relevant metadata, such as the time it was captured, the date it was captured, the location in was captured, and the like. This can allow the system to build more robust models that take additional variables as input (e.g., the time, date and/or location), rather than solely the image.

In some embodiments, the Images 205 and corresponding Identifiers 210 are collected during a training phase of the system. Additionally, in one embodiment, labeled exemplars are similarly collected and stored during a validation phase. In at least one embodiment, if a user corrects or objects to a generated identification, the provided replacement Identifier 210 is used to label the Image 205 and stored in the Repository 215. For example, suppose the system misclassifies an item during operation. If a user (e.g., a cashier or customer) rejects the classification and provides the correct label, the system can ingest this new classification into the Repository 215 in order to refine the models.

While in a deployed state, as illustrated in the workflow 200, Images 225 are captured and processed by the Machine Learning Component 220 to generate Identifications 230. In one embodiment, the system captures images and/or video of items (e.g., in a checkout area, such as on a belt or counter). For example, the system may capture images of items as they move down a belt, and automatically classify each using the trained model(s). In another embodiment, the user can place the item(s) in a designated area (such as on a scale), and the system can capture an image of the item (e.g., as its weight is being recorded).

By processing the Image(s) 225, the Machine Learning Component 220 is able to generate Identifications 230 without requiring manual intervention. Notably, in some embodiments, the items need not have any barcode or other label/identifier. For example, items such as boxes of cereal may have barcodes that can be readily identified and read by optical scanners. Other items without such labels, such as produce, typically require the user to manually enter an identifier. Embodiments of the present disclosure, however, allow the system to automatically determine the identifier for such irregular items, as well as labeled items.

In one embodiment, if a barcode or other machine-readable label is present, the system identifies and logs the item based on this label (e.g., using an optical scanner, or by identifying the label in the captured Image 225). If no label is found (e.g., if the system searches the Image 225 and cannot locate any machine-readable identifiers), the Machine Learning Component 220 can instead process the image to classify it and return an Identification 230. This allows the system to respond dynamically to both labeled and unlabeled items.

Further, in some embodiments, the Machine Learning Component 220 generates a confidence of the Identification 230. In one such embodiment, if the confidence is below a predefined threshold, the system requests that the user manually enter an identifier. In at least one embodiment, the system can narrow the set of possible identifiers using the Machine Learning Component 220. For example, rather than request the user enter an identifier, the system may select two or more possible classifications based on the Machine Learning Component 220. This may include selecting the predictions with sufficiently high confidence (e.g., above a designated threshold), selecting the top N options, and the like. The system can them present this subset of possibilities to the user, and request that they select the correct classification. This can improve the experience of the user and reduce the time needed to proceed with the transaction, allowing the model to assist even when it may be uncertain regarding the true identity of the item.

Figure 3:
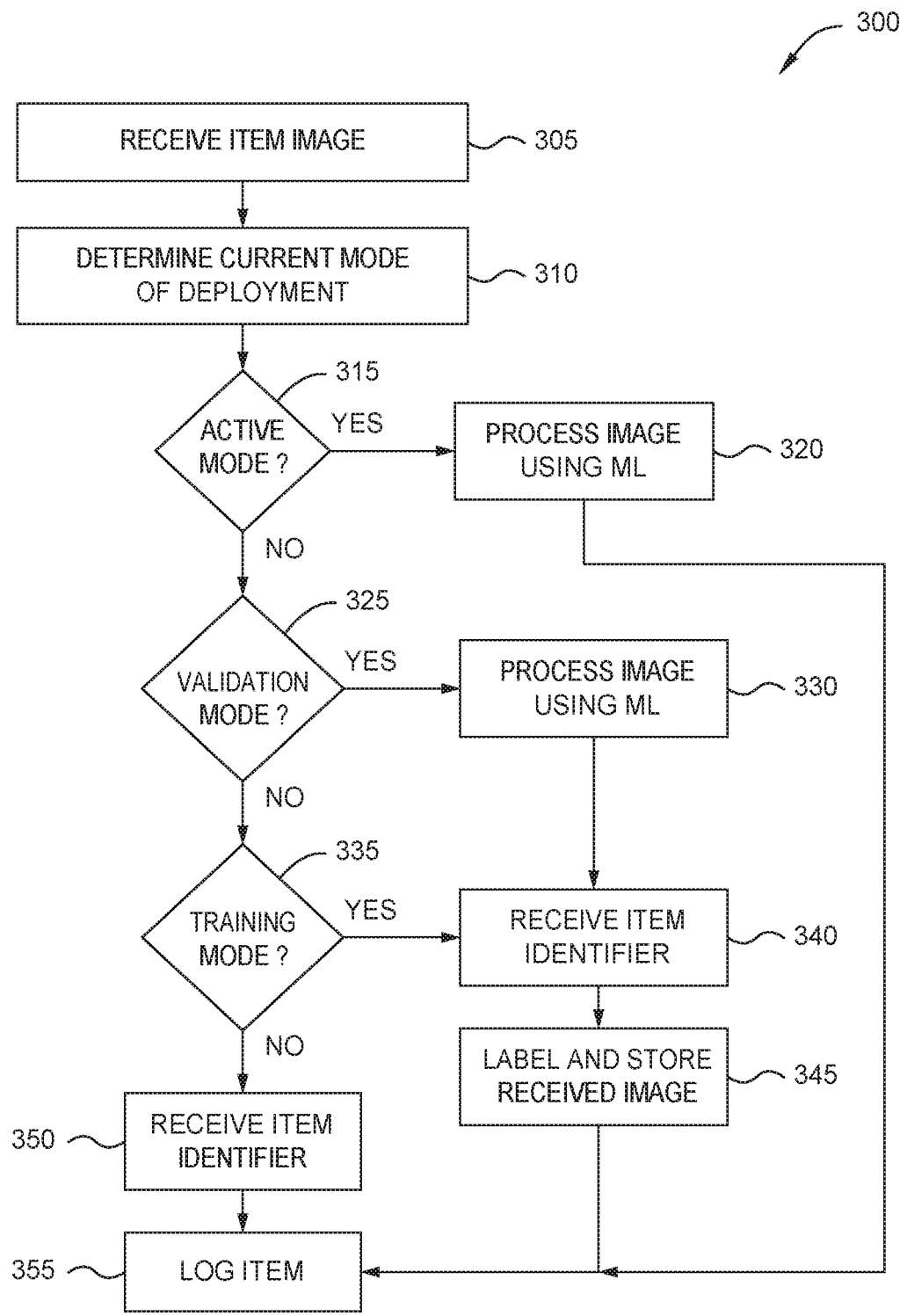
FIG. 3 is a flow diagram illustrating a method for curating training data and deploying machine learning models for image recognition, according to one embodiment disclosed herein.

FIG. 3 is a flow diagram illustrating a method 300 for curating training data and deploying machine learning models for image recognition, according to one embodiment disclosed herein. The method 300 begins at block 305, when an item identification system receives an image of one or more items. As discussed above, in some embodiments, this image is captured based on determining that an item is present in a predefined region (e.g., on the scale of a checkout area). In other embodiments, images are continuously captured and searched for images (e.g., on a belt as items move past the camera(s)). The method 300 then continues to block 310.

At block 310, the item identification system determines its current mode of deployment. As discussed above, in some embodiments, the item identification system can operate in a number of modes or states, including an inactive state (where no images are captured/labeled), a training state (where images are captured and labeled with provided identifiers), a validation/verification state (where images are captured and processed to generate a prediction, which is compared against a provided identifier), and an active state (where images are captured and processed to identify items, and identifiers are not requested/received). In some embodiments, the item identification system automatically moves between states based on a variety of criteria.

For example, in one embodiment, the item identification system remains in a training state until a predefined percentage or ratio of the total number of items have been imaged (e.g., 95% of the available items in the store). In some embodiments, the item identification system remains in training until the items have been imaged a predefined number of times (e.g., 100 images for each item). Of course, any combination and variety of criteria can be utilized in various embodiments. Further, in some embodiments, the item identification system may operate in different modes depending on the particular item, the time of day, the location of the system, and the like.

At block 315, the item identification system determines whether it is in an active mode. If so, the method 300 proceeds to block 320, where the item identification system processes the received image using the trained ML model(s) in order to identify/classify the item(s) depicted therein. The method 300 then continues to block 355, where the item identification system logs the item. In embodiments, logging the item generally includes adding the identified item to a group, list, or set of items, and/or storing an indication/identity of the item. For example, in a retail setting, the item identification system adds the item to the set of items involved in the transaction, such that the customer can complete the transaction and purchase the set of items.

Returning to block 315, if the item identification system determines it is not in an active status, the method 300 proceeds to block 325. At block 325, the item identification system determines whether it is in validation mode. If so, the method 300 continues to block 330, where the item identification system processes the received image using the trained ML model(s) in order to classify/identify the item(s) depicted. Rather than simply log these predictions, however, the method 300 then continues to block 340, where the item identification system receives an indication of the item identifier for the item depicted in the image.

In one embodiment, this includes a scan of the item (e.g., of a barcode or other machine-readable label on the item). In another embodiment, this includes receiving user input specifying the item and/or providing the item identifier (e.g., via a computer or mobile device). The method 300 then proceeds to block 345, where the item identification system labels and stores the received image based on the received indication. That is, the item identification system labels the image with the identifier included in the indication, and stores the labeled exemplar in a repository. In some embodiments, as discussed above, the item identification system further stores other data such as the time of the indication, the location of the indication, and the like.

Further, in some embodiments, the item identification system determines whether the predicted identification (determined in block 330) aligns with the actual identifier (received in block 340). If so, the item identification system can store an indication that the model was correct. If not, the item identification system can record that the model was incorrect. In this way, the accuracy and reliability of the model can be determined with granularity. This can include determining the model's accuracy on a per-item basis, as well as determining the accuracy at various times of day, during various times of the year, at various locations (including different enterprises and different regions within a single enterprise), and the like.

Based on this validation, the item identification system can determine whether the model(s) are ready for active deployment with respect to each factor. For example, some items may be sufficiently accurate for full deployment, while others require more training data. Similarly, the model(s) may be accurate for some locations but not others (or during some times, but not during others). The method 300 then continues to block 355, where the item identification system logs the item based on the identifier received in block 340.

Returning to block 325, if the item identification system determines that it is not in validation mode, the method 300 continues to block 335. At block 335, the item identification system determines whether it is in training mode. If so, the method 300 continues to block 340 to receive an item identifier, as discussed above. Additionally, at block 345, the item identification system labels and stores the received image based on the received identifier. In this way, the item identification system can collect and curate a training data for subsequent use in training or refining the model(s). The method 300 then continues to block 355 to log the item, as discussed above.

Returning to block 335, if the item identification system determines that it is not in a training mode, the method 300 continues to block 350 where the item identification system receives an indication of the item identifier, as discussed above. At block 355, the item identification system then logs the item, as discussed above. In the illustrated embodiment, the item identification system does not evaluate or store any images of the item when the system is in a disabled mode. In some embodiments, the item identification system does not receive or capture images while in disabled mode. In other embodiments, it discards any images received.

Figure 4:
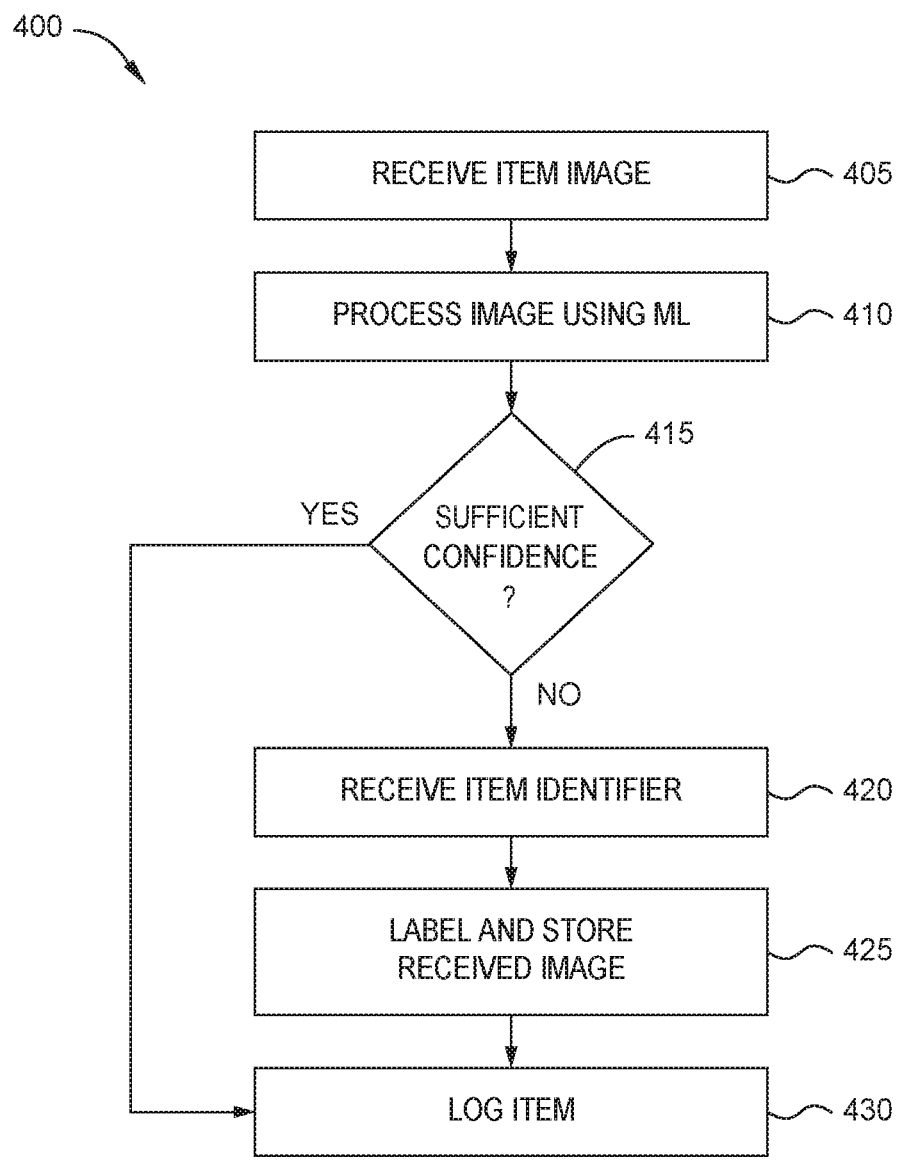
FIG. 4 is a flow diagram illustrating a method for training, evaluating, and deploying machine learning models for image recognition, according to one embodiment disclosed herein.

FIG. 4 is a flow diagram illustrating a method 400 for training, evaluating, and deploying machine learning models for image recognition, according to one embodiment disclosed herein. The method 400 can be utilized to monitor the state of the system and determine the appropriate operational mode for given items, various times of day, and the like. This allows the system to dynamically reconfigure itself into different modes based on the reliability of the model(s) for the current context. The method 400 begins at block 405, where an item identification system receives an image of an item.

In one embodiment, the image is captured based on determining that an item is present in a predefined region (e.g., on the scale of a checkout area), as discussed above. In other embodiments, images are continuously captured and searched for images (e.g., on a belt as items move past the camera(s)). The method 400 then continues to block 410, where the item identification system processes the received item using one or more trained ML models. As discussed above, this allows the item identification system to generate a classification/identification of the item using visual ML models. The method 400 then continues to block 415.

At block 415, the item identification system determines whether the generated prediction is associated with sufficiently-high confidence. In some embodiments, the ML model(s) generate a confidence score along with the classification, indicating a likelihood that the classification is accurate. In one such embodiment, therefore, the item identification system determines, at block 415, whether this confidence score exceeds a predefined threshold of minimum confidence. If the generated confidence score is high (e.g., because the system has been trained on a large number and/or variety of images of the item), it is likely that the classification is accurate.

If the confidence is lower, however, it may indicate the classification is inaccurate. This may be because it is a new item entirely and is being wrongly classified into a category. It may also be because the item has relatively few exemplars in the training set. Similarly, the confidence may be low because of lighting conditions, orientation of the item, and the like. Regardless, lower confidence indicates that the system should not trust the classification.

In some embodiments, in addition to the confidence score, the item identification system can further consider other factors affecting confidence, such as known strengths and weaknesses at given times, locations, and/or dates. For example, in one such embodiment, even if the confidence score is high, the item identification system may nevertheless determine that the overall prediction confidence is low, based on determining that predictions made at the current time are significantly more likely to be incorrect, as compared to classifications made at other times.

If the item identification system determines that its confidence is high, the method 400 continues to block 430, where the item identification system simply logs the item, as discussed above. If confidence is below the predefined threshold, however, the method 400 continues to block 420. At block 420, the item identification system receives an indication of the item (e.g., an item identifier). As discussed above, this can include reading a machine-readable label, requesting and/or receiving user input, and the like. The method 400 then proceeds to block 425, where the item identification system labels the received image using the received identifier, and stores it as a training exemplar for future use. Finally, at block 430, the item identification system logs the item.

Advantageously, the method 400 allows the system to respond in a dynamic way to each newly-received image. This allows it to process some items automatically while requesting confirmation for other items in a seamless manner that builds and curates the models. Further, this process can include consideration of other factors affecting accuracy, such as the location of the deployment, the time of day, the day of the year, and the like. This leads to robust models that can be deployed and utilized for some items, even while it continues to train and learn for others.

Figure 5:
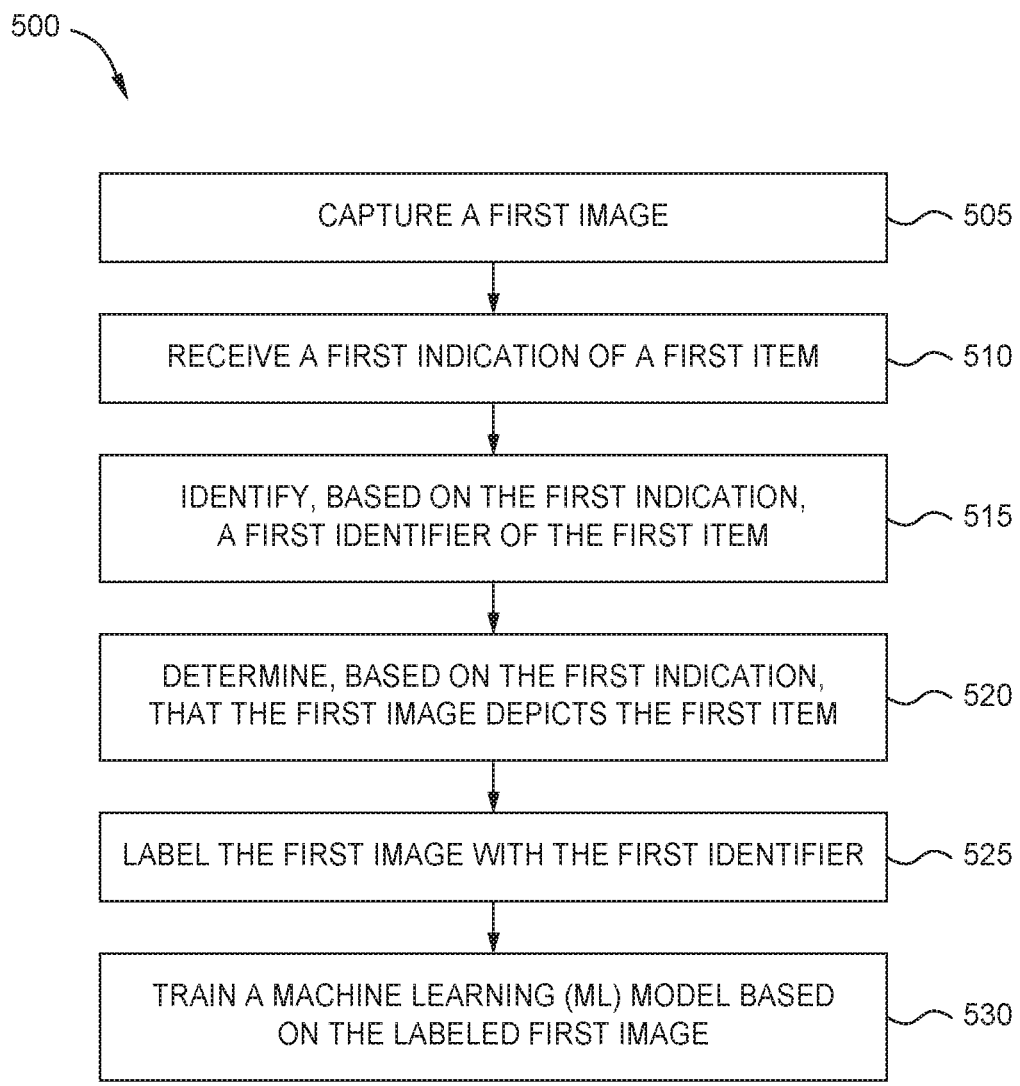
FIG. 5 is a flow diagram illustrating a method for training a machine learning model, according to one embodiment disclosed herein.

FIG. 5 is a flow diagram illustrating a method 500 for training a machine learning model, according to one embodiment disclosed herein. The method 500 begins at block 505, where an item identification system captures a first image. At block 510, the item identification system receives a first indication of a first item. The method 500 then continues to block 515, where the item identification system identifies, based on the first indication, a first identifier of the first item. Further, at block 520, the item identification system determines, based on the first indication, that the first image depicts the first item. The method 500 then proceeds to block 525, where the item identification system labels the first image with the first identifier. Additionally, at block 530, the item identification system trains a machine learning (ML) model based on the labeled first image.

FIG. 6 is a block diagram depicting an Image Identification System 605 configured to automatically curate training data and deploy trained models, according to one embodiment disclosed herein. Although depicted as a physical device, in embodiments, the Image Identification System 605 may be implemented as a virtual device or service, and/or across a number of devices (e.g., in a cloud environment). As illustrated, the Image Identification System 605 includes a Processor 610, Memory 615, Storage 620, a Network Interface 625, and one or more I/O Interfaces 630. In the illustrated embodiment, the Processor 610 retrieves and executes programming instructions stored in Memory 615, as well as stores and retrieves application data residing in Storage 620. The Processor 610 is generally representative of a single CPU and/or GPU, multiple CPUs and/or GPUs, a single CPU and/or GPU having multiple processing cores, and the like. The Memory 615 is generally included to be representative of a random access memory. Storage 620 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 630. Further, via the Network Interface 625, the Image Identification System 605 can be communicatively coupled with one or more other devices and components (e.g., via the Network 680, which may include the Internet, local network(s), and the like). Additionally, the Network 680 may include wired connections, wireless connections, or a combination of wired and wireless connections. As illustrated, the Processor 610, Memory 615, Storage 620, Network Interface(s) 625, and I/O Interface(s) 630 are communicatively coupled by one or more Buses 675.

In the illustrated embodiment, the Storage 620 includes a set of Labeled Image Data 655. In embodiments, the Labeled Image Data 655 includes a set of images depicting one or more items. Each image is further associated with a label indicating the item(s), if any, that are depicted in the image. In some embodiments, other metadata is included in the label, such as the time and/or date when the image was captured, the location the image was captured, and the like. As discussed above, in some embodiments, this Labeled Image Data 655 is used to train and refine one or more ML model(s). These models can then receive new images and classify/identify the item(s) depicted therein.

In the illustrated embodiment, the Memory 615 includes an Image Evaluation Application 635. Although depicted as software residing in Memory 615, in embodiments, the operations and functionality of the Image Evaluation Application 635 may be implemented using hardware, software, or a combination of hardware and software. In the depicted embodiment, the Image Evaluation Application 635 includes an Image Component 640, an Identifier Component 645, and an ML Component 650. Although depicted as discrete components for conceptual clarity, in embodiments, the operations of the Image Component 640, Identifier Component 645, and ML Component 650 may be combined or distributed across any number of components and devices.

In an embodiment, the Image Component 640 is used to capture and pre-process images for evaluation. In some embodiments, when the Image Evaluation Application 635 receives an indication of an item in a location, the Image Component 640 triggers one or more cameras to capture one or more images of the location. For example, if the system determines that an item is in a sensing area (e.g., based on weight on a scale, user input, and the like) the Image Component 640 can cause one or more cameras proximate to the area to capture images of the item. In some embodiments, the Image Component 640 can additionally pre-process captured images, such as by removing distortion, vectorising them, performing color balancing, and the like.

In some embodiments, the Identifier Component 645 determines the identifier of items, and uses labels the received image(s) appropriately. For example, in one embodiment, the Identifier Component 645 identifies and extracts identifiers from barcodes or other machine-readable labels on items. In some embodiments, the Identifier Component 645 receives identifiers provided by users (e.g., by inputting an indication of the item on a computer). In some embodiments, when such an indication is received, the Identifier Component 645 identifies the corresponding image(s) based on the time and/or location of the indication. In another embodiment, the Identifier Component 645 triggers the camera(s) to capture images of the corresponding location of the indication. These images are then labeled and stored as Labeled Image Data 655.

In an embodiment, the ML Component 650 is used to train, refine, evaluate, and deploy ML model(s) based on the Labeled Image Data 655. For example, during a training phase, the ML Component 650 can iteratively provide labeled image as input while utilizing the corresponding label as target output, and utilize back-propagation to iteratively refine the internal weights and parameters of the models. This allows the ML Component 650 to train ML models to identify and classify item(s) in images. In some embodiments, the ML Component 650 similarly processes newly-received images using the trained models, and returns the predicted identifiers and/or confidence scores.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Image Evaluation Application 635) or related data available in the cloud. For example, the Image Evaluation Application 635 could execute on a computing system in the cloud and curate image data in order to train and maintain ML models. In such a case, the Image Evaluation Application 635 could label received images and store them at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
   capturing a first image;
   receiving a first indication of a first item;
   identifying, based on the first indication, a first identifier of the first item;
   determining, based on the first indication, that the first image depicts the first item;
   labeling the first image with the first identifier;
   training a machine learning (ML) model of an ML system based on the labeled first image;
   capturing a second image;
   generating a predicted identifier based on processing the second image using the ML model;
   determining that the ML system is in a verification state;
   receiving a second indication of the first item;
   identifying, based on the second indication, the first identifier of the first item; and
   storing the second image, along with the predicted identifier and the first identifier.

2. The method of claim 1, further comprising:
   training the ML model based on the labeled first image based on determining that the ML system is in a training phase.

3. The method of claim 1, the method further comprising:
   determining that the predicted identifier and the first identifier do not match; and
   refining the ML model based on the second image and the first identifier.

4. The method of claim 1, the method further comprising:
   determining that the ML system is in an active state;
   refraining from receiving a third indication of the first item; and
   logging the predicted identifier.

5. The method of claim 1, wherein determining, based on the first indication, that the first image depicts the first item comprises:
   identifying a timestamp associated with the first indication;
   identifying a location associated with the first indication; and
   determining that the timestamp and location associated with the first indication align with a timestamp and location associated with the first image.

6. The method of claim 1, wherein determining, based on the first indication, that the first image depicts the first item comprises:
   identifying a location associated with the first indication; and
   in response to receiving the first indication, causing the first image to be captured of the location associated with the first indication.

7. A computer-readable storage medium containing computer program code that, when executed by operation of one or more computer processors, performs an operation comprising:
   capturing a first image;
   receiving a first indication of a first item;
   identifying, based on the first indication, a first identifier of the first item;
   determining, based on the first indication, that the first image depicts the first item;
   labeling the first image with the first identifier;
   training a machine learning (ML) model of an ML system based on the labeled first image;
   capturing a second image;
   generating a predicted identifier based on processing the second image using the ML model;
   determining that the ML system is in a verification state;
   receiving a second indication of the first item;
   identifying, based on the second indication, the first identifier of the first item; and
   storing the second image, along with the predicted identifier and the first identifier.

8. The computer-readable storage medium of claim 7, the operation further comprising:
   determining that the predicted identifier and the first identifier do not match; and
   refining the ML model based on the second image and the first identifier.

9. The computer-readable storage medium of claim 7, the operation further comprising:
   determining that the ML system is in an active state;
   refraining from receiving a third indication of the first item; and
   logging the predicted identifier.

10. The computer-readable storage medium of claim 7, wherein determining, based on the first indication, that the first image depicts the first item comprises:
    identifying a timestamp associated with the first indication;
    identifying a location associated with the first indication; and
    determining that the timestamp and location associated with the first indication align with a timestamp and location associated with the first image.

11. A system comprising:
    one or more computer processors; and
    a memory containing a program which when executed by the one or more computer processors performs an operation, the operation comprising:
      capturing a first image;
      receiving a first indication of a first item;
      identifying, based on the first indication, a first identifier of the first item;
      determining, based on the first indication, that the first image depicts the first item;
      labeling the first image with the first identifier;

training a machine learning (ML) model of an ML system based on the labeled first image;
capturing a second image;
generating a predicted identifier based on processing the second image using the ML model;
determining that the ML system is in a verification state;
receiving a second indication of the first item;
identifying, based on the second indication, the first identifier of the first item; and
storing the second image, along with the predicted identifier and the first identifier.

12. The system of claim 11, the operation further comprising:
   determining that the predicted identifier and the first identifier do not match; and
   refining the ML model based on the second image and the first identifier.

13. The system of claim 11, the operation further comprising:
   determining that the ML system is in an active state;
   refraining from receiving a third indication of the first item; and
   logging the predicted identifier.

14. The system of claim 11, wherein determining, based on the first indication, that the first image depicts the first item comprises:
   identifying a timestamp associated with the first indication;
   identifying a location associated with the first indication; and
   determining that the timestamp and location associated with the first indication align with a timestamp and location associated with the first image.

* * * * *